April 14, 1936. V. R. DESPARD 2,037,122
ATTACHING MEANS FOR METAL PARTS AND INSULATING MATERIALS
Filed Jan. 19, 1932
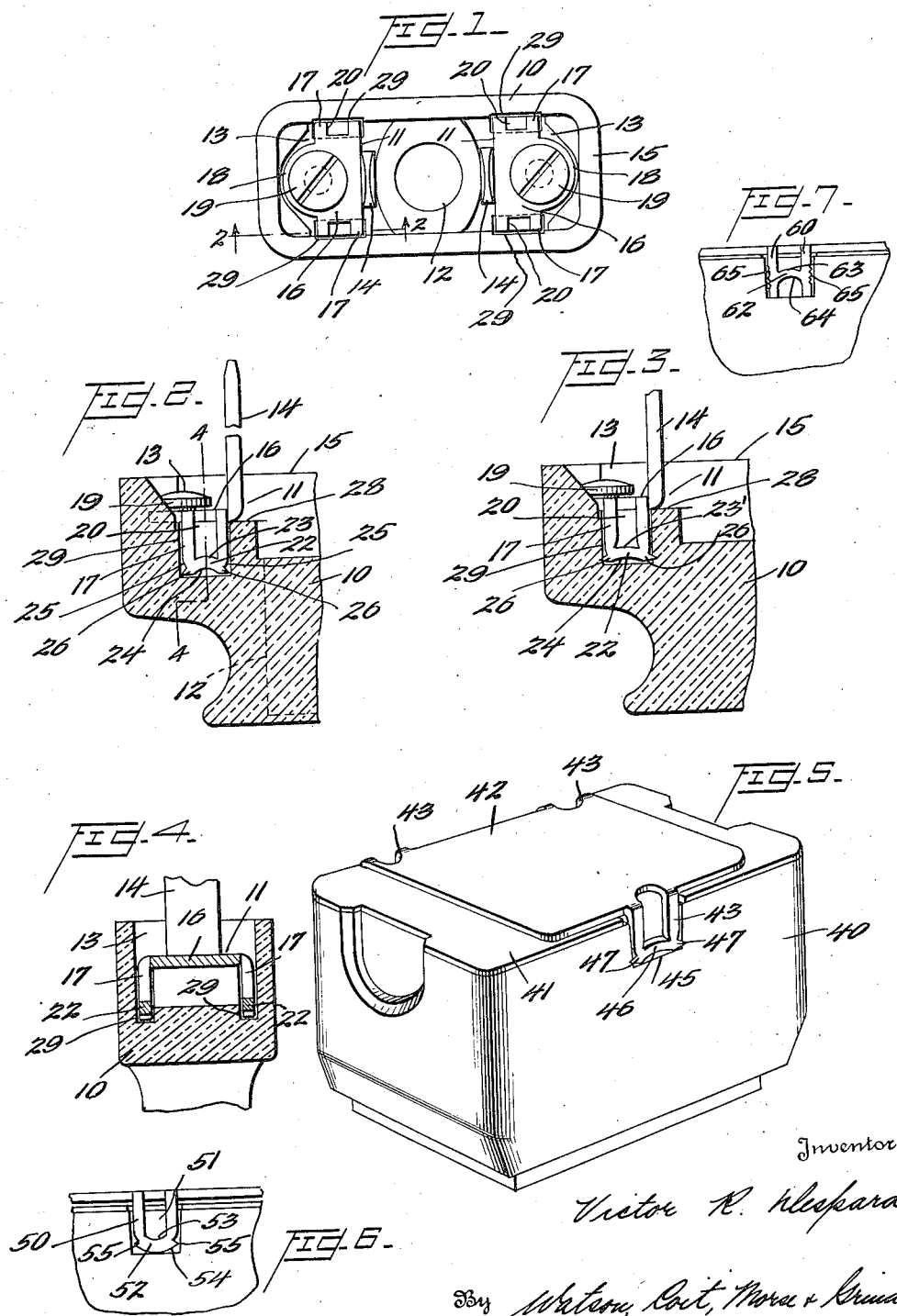
Inventor
Victor R. Despard,
By Watson, Coit, Mora & Grindle
Attorneys Patented Apr. 14, 1936

2,037,122

UNITED STATES PATENT OFFICE 2,037,122

ATTACHING MEANS FOR METAL PARTS AND INSULATING MATERIALS

Victor R. Despard, Syracuse, N. Y., assignor to Pass & Seymour, Inc., Syracuse, N. Y., a corporation of New York Application January 19, 1932, Serial No. 587,599

2 Claims. (Cl. 85—5)

This invention relates to electrical fittings and parts and particularly to means for attaching metal parts to insulation where it is not feasible or desirable to mold one about or in the other.

It is a general object of the present invention to provide novel and improved electrical fittings as well as means for attaching metal parts thereof to insulating parts.

In the manufacture of various electrical fittings such as switches, convenience receptacles, outlets, attachment plugs, and the like, the practice is trending toward the more universal use of molded insulating parts made from condensation products or other molded plastics. Each of these materials is less brittle and frangible than porcelain or other ceramics, and, while in many cases they permit of convenient molding of the metal parts, such as contacts, terminals, plug blades, and the like, directly into the insulating material, there are often times when it is neither desirable, feasible, nor commercially practicable to so combine the parts.

In accordance with the present invention, novel means are disclosed for the purpose, wherein a slot or recess is formed in the insulation material and a tongue on the metal part, which has at least one dimension closely fitting the corresponding dimension in the recess. Such tongue has means integral therewith adapted to be deformed, by the use of an appropriate tool, or otherwise, to expand the end of the tongue against the walls of the recess. Conveniently, pointed members or prongs on the tongue actually engage in the material of the walls of the recess upon this expansion, which is permitted by the nature of the material which can be flowed or deformed slightly without breaking. This results in a very effective joint between the parts and one which is readily formed and which requires no additional attaching means or parts nor any complicated molding, expensive dies, or the like. Furthermore, no heat is required so that the temper of the metal parts is not drawn nor the color changed.

In order to exemplify the use of such attaching means, the invention is shown in detail in connection with a novel attachment plug wherein the blade assemblies are secured to the cap or base portion by means of the present invention. There is also shown a second adaptation of the invention as applied to attaching means for a cover for a switch housing.

It will be understood that, although the invention is primarily intended for and is disclosed in connection with electrical fittings, it is in no sense to be construed as limited to such use, for it will be clear that the means for attaching a metal part to a non-metallic part is capable of general application in a great many arts, and it is the purpose of the appended claims to cover the invention broadly as well as specifically.

The invention will be more apparent to those skilled in the art upon a consideration of the accompanying drawing and following specification which, although disclosing the invention in detail in certain particulars, are subject to such variations and modifications as fall within the scope of the appended claims.

In said drawing:

Figure 1 is a face view of an attachment plug forming part of the present invention;

Figure 2 is a fragmentary section taken on line 2—2 thereof and showing the securing means for the blade assembly prior to being expanded into position;

Figure 3 is a view similar to Fig. 2 but showing the metal of the fastening tongue deformed to cause the prongs to engage in the material of the cap to attach the parts together;

Figure 4 is a transverse section taken on line 4—4 of Figure 2;

Figure 5 is a perspective view of a switch casing showing the cover secured in place by means incorporating the present invention;

Figure 6 is a view of a fragment of a structure similar to Figure 5 showing a modified form of the invention; and Figure 7 is a view of a fragment of a structure similar to Figure 5 showing a further modified form of the invention.

As before stated, the invention resides broadly in the means for securing a metal part to an insulating part but is shown specifically in two examples, the first included in Figures 1 to 4 covering a novel form of attachment plug wherein the blade assemblies are secured to the insulating cap in accordance with the present invention. In the second form, shown in Figure 5, a cover is held on a switch block by means of a metal plate attached to the switch block in accordance with the novel fastening means of the present invention, and Figure 6 shows a modification of the invention not only applicable to the arrangement of Figure 5 but to various other uses.

Referring now to the drawing for a better understanding of the invention, and first to Figures 1 to 4 inclusive, wherein a practical embodiment is disclosed, there is shown at 10 the cap or base of an attachment plug formed of some suitable insulating material, either a phenol condensation product or a cold or hot molded insulating material having such physical characteristics as will permit slight deformation without breaking or cracking. To this cap it is desired to secure a pair of contact blade assemblies 11, identical in construction, so that a description of one will suffice for both.

The cap is provided with a longitudinal aperture 12 for the passage of the conductors and spaced on either side of this and in the main recess 13 in the end of the cap are the inner ends of the two blade assemblies, the blade portions proper 14 extending parallel to each other and at right angles to the plane of the end 15 of the cap.

Each contact blade assembly comprises the blade proper 14 of substantially uniform width and thickness, a base 16 having its face in a plane at right angles to the longitudinal axis of the blade but parallel to the end face 15 of the cap and a pair of depending tongues 17 substantially identical in construction, parallel to each other and to a plane lying midway between them and including the longitudinal axis of the blade. The plane of the greatest width of the blade is at right angles to this imaginary intermediate plane. Preferably the blade assembly is stamped from heavy sheet metal and bent up from a flat blank to the form shown. The base has the curved rear portion 18 which is perforated to receive the threaded portion of a terminal screw 19 for connecting a wire thereto.

Each tongue 17 is provided with a longitudinal central aperture 20 extending from near the end thereof to the junction of the tongue and base for a purpose to be later described. This aperture is visible in Figure 1. In effect, the tongue is divided by the aperture into a pair of spaced arms, connected at the remote ends by a strap 22. This strap is convex on its upper surface as at 23 and a notch provides a concave lower surface 24 therefor at the end of the tongue. Notches 25 in the longitudinal edges of the tongue near the outer end thereof serve to form the prongs 26 at the ends of the edges.

When the blade assembly is mounted in position, the base 16 thereof rests on a surface 28 in the cap, and the tongues 17 are received in recesses 29 below this surface. These recesses are of substantially the same depth as the length of the tongue, are of a width, in plan, slightly greater than the thickness of the tongue and of a length, in plan, just several thousandths of an inch greater than the width of the tongue. Only sufficient clearance is thus provided to permit ready assembly of the two tongues into the spaced recesses 29 in the cap and when assembled the structure appears as seen in Figure 2.

To secure the blade assembly in position, thin bladed tools are inserted, preferably simultaneously, straddling the base 16 and longitudinally into the recesses 20, passing close down beside the ends of the base and engage the convex upper surface 23 of the end straps of the tongues. Suitable pressure by the tools on these surfaces causes the straps to be substantially straightened out as shown at 23' in Figure 3. Each strap 22 in straightening is increased in overall length, thus spreading or splaying the arms at the outer portion of the tongue and causing the prongs 26 to be projected outwardly away from each other, and into the material of the walls of the recess in the cap. The distance between the ends of the prongs becomes considerably greater than the length of the recess 29 in the cap so that each tongue is securely fastened to the cap, thereby holding the blade assembly rigidly in position.

It should be noted that the general tendency for each prong while moving outwardly is to rotate about an axis in its arm so that it also moves slightly toward the base 16, thus drawing the tongue down into the recess and firmly engaging the base with the surface 28 on which it rests, making a tighter and better assembly.

As another example of the use of the fastening means of the present invention, Figure 5 shows a switch casing 40 formed of suitable molded material on which it is desired to fasten an insulating cover 41. This is effected by overlying the cover with a metal plate 42 having formed integral therewith the three tongues 43 identical in construction with the tongues described in connection with Figures 1 to 4, inclusive, and each of which is received in an open-sided recess 45 in the base 40 as well as passing through a notch in the edge of the cover. The tongue shown on the front has been deformed by pressure on the upper surface of the bottom strap 46 thereof to deflect the tongues 47 into the material of the base to lock the plate 42, and consequently the cover 41, in position.

In Figure 6 a modification is shown in which the holding tongue 50 is provided with a central aperture 51 as in the preferred modification, but in which the connecting strap 52 for the two side arms of the tongue is convex outwardly so that its inner surface 53 is concave and its outer surface 54 convex. The prongs 55 are formed as before by notches in the edges above them.

This modified type of fastening tongue need not be provided with a full length central aperture for the strap is deformed to secure the tongue in position by a longitudinal thrust on the tongue, care being taken to provide the proper depth of recess in the insulating part so that the curved connecting strap at the bottom is straightened out by the tongue sides moving down to thus spread the prongs and lock the tongue in position in the recess.

In Figure 7 a further modification of the attaching tongue is shown, in which the recess for its reception is the same as in the previous forms but where the material is of such physical characteristics that it is substantially too hard to be compressed or deformed by the prongs as in the other forms.

In this case the tongue is again formed from two laterally spaced arms 60 secured together intermediate their ends by the straps 62 preferably convex on its upper surface as at 63 and concave on its lower surface as at 64. When this strap is straightened as described previously, its length increases and the arms 60 are spread apart until their outer edges opposite the ends of the strap are pressed tightly into frictional engagement with the walls of the recess to secure the tongue in position. The edges of the arms of the tongue may be smooth, or they may be serrated, roughened, or otherwise provided with projections or prongs 65, one or more in number, which aid in the frictional engagement to prevent slipping of the tongue out of the recess. Even though these projections are not pressed into the material because of its hardness, they nevertheless are of great assistance in preventing movement of the tongue out of the recess.

The position of the cross strap in relation to the length of the arms is more or less immaterial for it may be at the bottom, as in the case of prior modifications, or it may be substantially half-way between the ends, as shown in Figure 7, in which case the lower ends of the arms are used for preventing canting of any device which may extend above the tongue and/or as limiting means to position the tongue properly in respect to the depth of the recess.

It will be obvious that the fastening means described above is susceptible to wide and varied uses, and it is not the intent to have the claims limit the invention to the particular applications illustrated.

Having thus described the invention, what is claimed as new and desired to be secured by Letters Patent is:

1. A metal tongue for attaching to a non-metallic part and to be received into a recess therein, said tongue being flat and thinner than wide and including a pair of spaced arms, a laterally disposed prong at the outer edge of the end of each arm, and an integral strap of substantially the same thickness as the tongue connecting the arms between the prongs, said strap being extensible longitudinally by means of a tool applied between said spaced arms to spread the arms and prongs in the direction of the width of the tongue.

2. A fastener for attachment to a non-metallic part and having a sheet metal head and integral flat tongue, said tongue extending substantially at a right angle to the head and from an edge thereof and adapted to be received into a recess in the non-metallic part, said tongue including a pair of spaced arms, a laterally disposed prong at the outer edge of the end of each arm, and an integral strap connecting the arms substantially between the prongs, the edge of the head having a notch forming a continuation of the space between the tongue arms whereby the strap may be extended longitudinally by means of a tool inserted into said recess through said notch and space between the tongue arms to thereby spread the arms and prongs to engage the walls of the recess.

VICTOR R. DESPARD.